US012627520B2

(12) United States Patent
Nandy et al.

(10) Patent No.:    US 12,627,520 B2
(45) Date of Patent:       May 12, 2026

(54) MULTICAST DATA STREAM WITH IMPROVED USER EXPERIENCE

(71) Applicant: HEWLETT PACKARD ENTERPRISE DEVELOPMENT LP, Spring, TX (US)

(72) Inventors: Tathagata Nandy, Bangalore (IN); Chethan Chavadibagilu Radhakrishnabhat, Bangalore (IN); Subramanian Muthukumar, Bangalore (IN); Mark A Pearson, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 52 days.

(21) Appl. No.: 18/656,305

(22) Filed: May 6, 2024

(65) Prior Publication Data

US 2025/0279907 A1      Sep. 4, 2025

(30) Foreign Application Priority Data

Mar. 1, 2024    (IN) ............................. 202441015434

(51) Int. Cl.
*H04L 12/18*         (2006.01)
*H04L 47/10*         (2022.01)
(52) U.S. Cl.
CPC ........ *H04L 12/185* (2013.01); *H04L 12/1822* (2013.01); *H04L 47/15* (2013.01)
(58) Field of Classification Search
CPC ... H04L 12/185; H04L 12/1822; H04L 47/15; Y02D 30/00
See application file for complete search history.

(56) References Cited

U.S. PATENT DOCUMENTS

2006/0143669 A1    6/2006  Cohen
2008/0205394 A1*   8/2008  Deshpande ......... H04L 12/1854
                                                     370/390

(Continued)

OTHER PUBLICATIONS

Cheshire et al. "Multicast DNS", Request for Comments: 6762, Feb. 2013, 70 pages.

(Continued)

*Primary Examiner* — Farzana B Huq
(74) *Attorney, Agent, or Firm* — Hewlett Packard Enterprise Patent Department

(57)                    ABSTRACT

A network device receives multicast data originating from a source device, wherein the network device is in communication with at least one client device. The system identifies traffic patterns associated with the multicast data and classifies the multicast data into categories based on the traffic patterns. The network device stores an ordered list of multicast groups previously joined by the client device. Responsive to determining that the client device requests to join a first multicast group, the network device sends a first join request for the client device to join a highest-ranking multicast group in the ordered list. Responsive to determining that the client device requests to leave a current multicast group and to join a new multicast group, the network device selects a second multicast group from the ordered list and sends a second join request for the client device to join the second multicast group.

17 Claims, 6 Drawing Sheets

(56)                References Cited

U.S. PATENT DOCUMENTS

| | | | | |
|---|---|---|---|---|
| 2010/0309814 A1* | 12/2010 | Wang | .................. | H04L 12/1818 |
| | | | | 370/254 |
| 2014/0237576 A1* | 8/2014 | Zhang | ..................... | G06F 21/32 |
| | | | | 726/7 |
| 2016/0087808 A1* | 3/2016 | Schmidt | .............. | H04L 12/1863 |
| | | | | 370/390 |

OTHER PUBLICATIONS

Christensen et al., "Considerations for Internet Group Management Protocol (IGMP) and Multicast Listener Discovery (MLD) Snooping Switches", Request for Comments: 4541, May 2006, 16 pages.
Sarni et al., "A Novel Channel Switching Scenario in Multicast IPTV Networks", 2009, 6 pages.
Sasaki et al., "Rapid Channel Zapping for IPTV Broadcasting with Additional Multicast Stream", Jun. 2008, 7 pages.

* cited by examiner

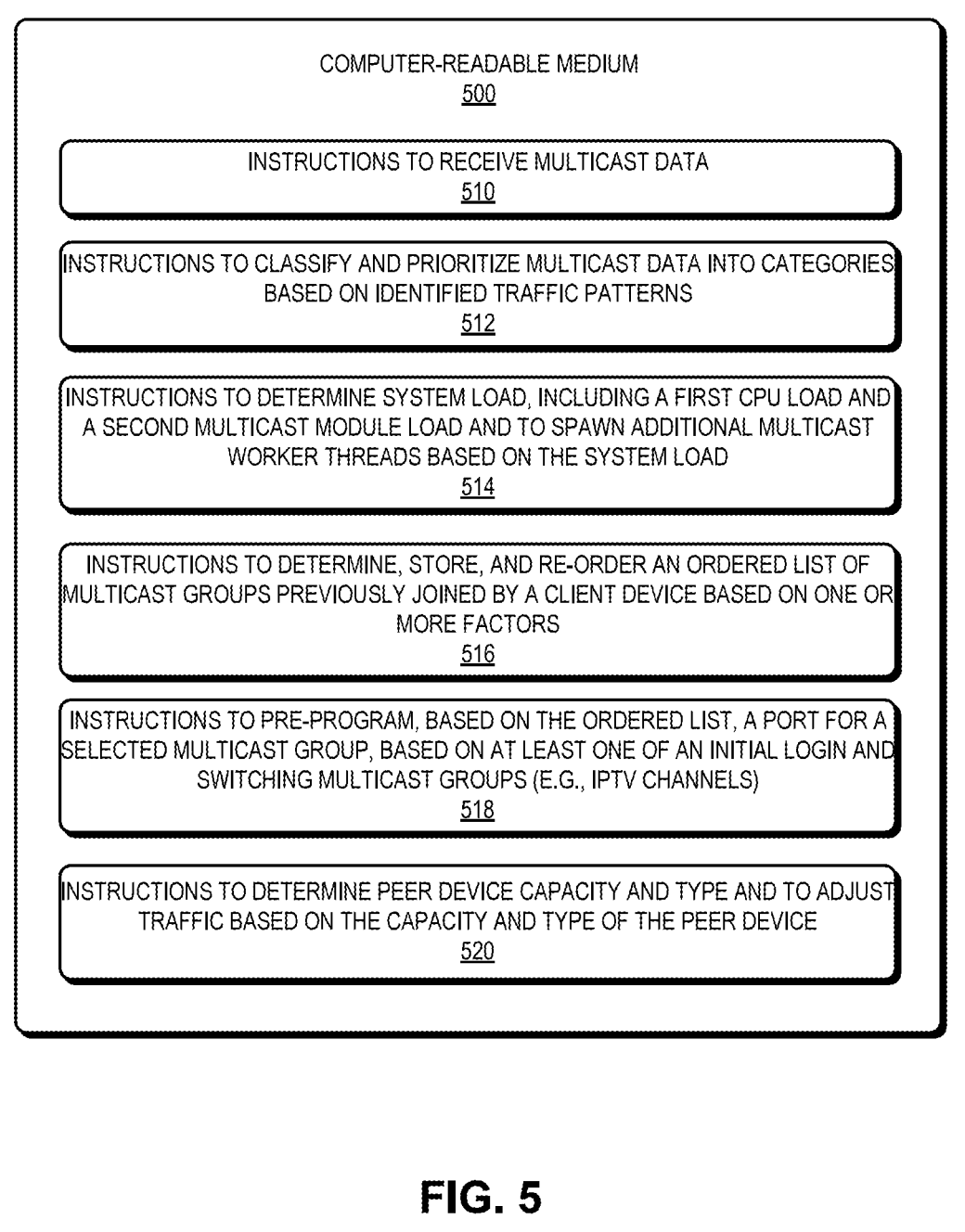

COMPUTER-READABLE MEDIUM
500

INSTRUCTIONS TO RECEIVE MULTICAST DATA
510

INSTRUCTIONS TO CLASSIFY AND PRIORITIZE MULTICAST DATA INTO CATEGORIES BASED ON IDENTIFIED TRAFFIC PATTERNS
512

INSTRUCTIONS TO DETERMINE SYSTEM LOAD, INCLUDING A FIRST CPU LOAD AND A SECOND MULTICAST MODULE LOAD AND TO SPAWN ADDITIONAL MULTICAST WORKER THREADS BASED ON THE SYSTEM LOAD
514

INSTRUCTIONS TO DETERMINE, STORE, AND RE-ORDER AN ORDERED LIST OF MULTICAST GROUPS PREVIOUSLY JOINED BY A CLIENT DEVICE BASED ON ONE OR MORE FACTORS
516

INSTRUCTIONS TO PRE-PROGRAM, BASED ON THE ORDERED LIST, A PORT FOR A SELECTED MULTICAST GROUP, BASED ON AT LEAST ONE OF AN INITIAL LOGIN AND SWITCHING MULTICAST GROUPS (E.G., IPTV CHANNELS)
518

INSTRUCTIONS TO DETERMINE PEER DEVICE CAPACITY AND TYPE AND TO ADJUST TRAFFIC BASED ON THE CAPACITY AND TYPE OF THE PEER DEVICE
520

FIG. 5

MULTICAST DATA STREAM WITH IMPROVED USER EXPERIENCE

BACKGROUND

Field

Multicast streams may be used to distribute data to multiple users/receivers or client devices. Each client device sends a "join" or a "leave" request for a particular multicast group in order to start or stop receiving data from the particular multicast group. The "join latency" is the amount of time between a user sending the join request and the user receiving the data. Similarly, the "leave latency" is the amount of time between the user sending the leave request and the user no longer receiving data. A high join or leave latency can affect the user experience and result in undesired outages.

BRIEF DESCRIPTION OF THE FIGURES

FIG. 5 illustrates a computer-readable medium which facilitates a multicast data stream with improved user experience, in accordance with an aspect of the present application.

In the figures, like reference numerals refer to the same figure elements.

DETAILED DESCRIPTION

Figure 1:
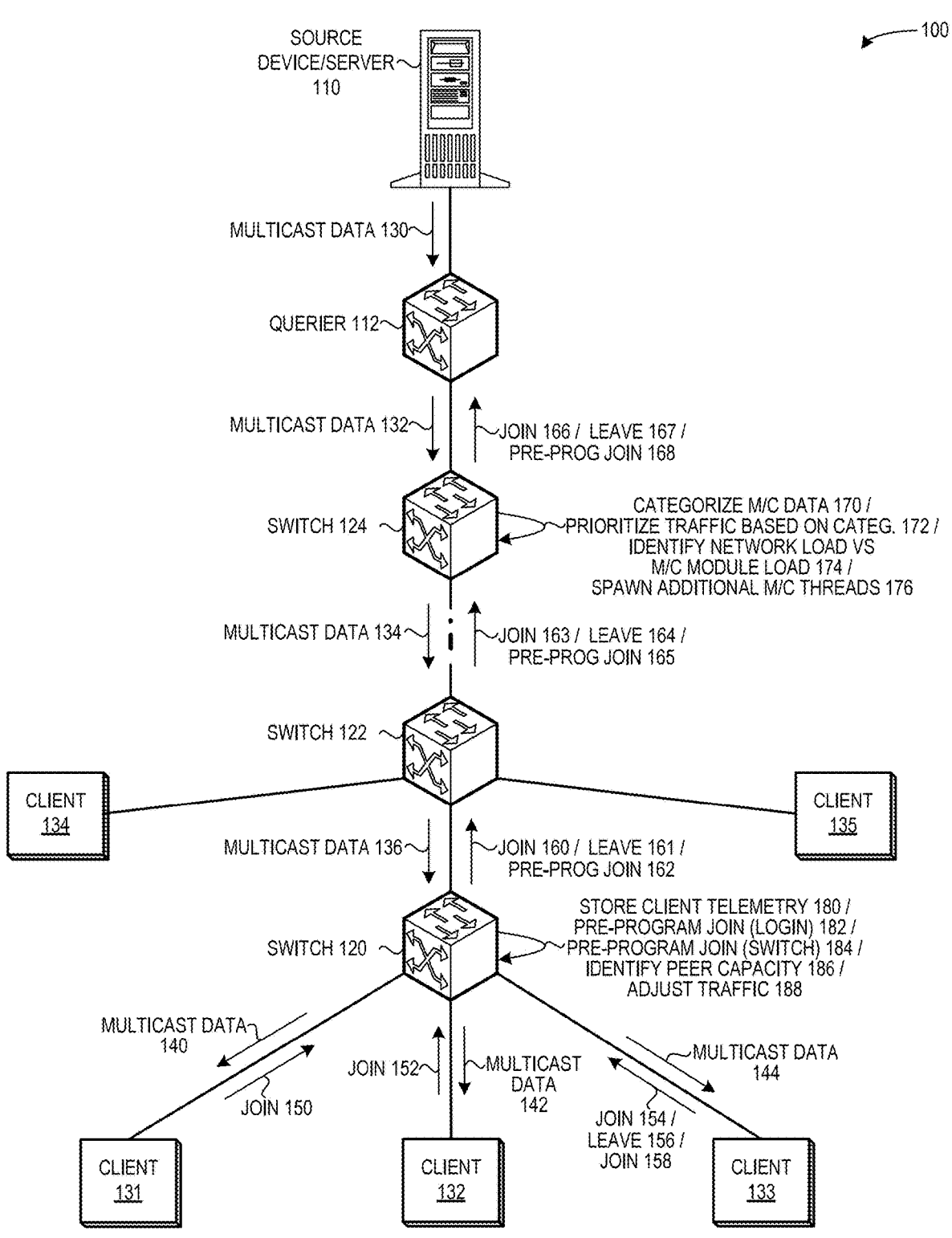
FIG. 1 illustrates a network environment for a multicast data stream with improved user experience, in accordance with an aspect of the present application.

Aspects of the instant application can reduce potential outages in receiving multicast data by computing analytics in the control plane to enhance the performance of the data plane, which can result in providing multicast data with an improved user experience. Network devices can take corresponding preventive actions to improve the user experience.

For example, Internet Protocol (IP) televisions (TVs) typically use multicast streams to distribute content to multiple users/receivers. A source may stream data to end users or client devices via a cascading hierarchy of network devices. Each client device can send a "join" or a "leave" request for a particular multicast group (e.g., to start or stop watching a particular IPTV channel). A high join or leave latency can affect the user experience and result in undesired outages. For example, a high join latency may occur when a user initially logs in to an IPTV and selects a channel. In another example, the user may switch between IPTV channels, which results in a leave request followed by a join request. A high latency in performing either operation may result in an undesirable viewing experience for the user, resulting in, e.g., delay, jitter, or outage. A negative user experience may result in customer dissatisfaction and potential loss of revenue.

Aspects of the instant application provide a system which can reduce potential multicast data outages by computing analytics in the control plane (e.g., handling join/leave requests) to enhance the performance of the data plane (e.g., sending multicast data to the end user). The described system can use the analytics to take preventive actions in the network devices, which can result in an improved user experience, both upon joining and leaving a multicast group (e.g., upon initial login and during channel-switching in IPTV).

During operation, the system can analyze and categorize a pattern of multicast traffic, and prioritize the multicast traffic accordingly based on the category or pattern. In this disclosure, IPTV is provided as a non-limiting example of one type of multicast data, and "IPTV channels" are provided as non-limiting examples of multicast groups. The system can further identify the load of a central processing unit (CPU) of a network device as well as the load associated with multicast traffic in the network device, and spawn additional threads if the multicast traffic load is high. The system can also predict and pre-program join requests by tracking and storing user activity and by ranking a certain number of channels, predicting a first or next channel, and automatically sending a "pre-programmed" join request for the predicted first or next channel. In addition, the system can identify the type and capacity of peer devices via Link Layer Discovery Protocol (LLDP) packets and adjust control and data plane traffic based on the type and capacity. Details of these methods are described below in conjunction with FIGS. 1 and 2.

The term "Internet Group Management Protocol" or "IGMP" refers to a communication protocol used by hosts and adjacent network devices (such as routers and switches) on IPv4 networks to establish multicast group memberships. IGMP may be used in one-to-many networking applications (e.g., online streaming video, gaming, IPTV). While multicast management on IPv4 network may use IGMP, multicast management on IPv6 networks may use Multicast Listener Discovery (MLD). IGMP and MLD are described in further detail in Request for Comments (RFC) 4541, "Considerations for Internet Group Management Protocol (IGMP) and Multicast Listener Discovery (MLD) Snooping Switches."

The terms "host," "client," and "client device" are used interchangeably in this disclosure and refer to a device which can subscribe to a multicast data stream by sending a "join request" (e.g., an IGMP join request). A client device can send the join request toward a querier device, and the join request may indicate a request to join a particular multicast group (i.e., to receive the data which is distributed to the particular multicast group). The client device can also leave the particular multicast group by sending a "leave request" (e.g., an IGMP leave request) toward the querier device, and the leave request may indicate a request to leave a second multicast group. The client device may be subscribed to only a single multicast group at one time or to multiple multicast groups at the same time. In some embodiments, the client device may be subscribed to multiple multicast groups at the same time, but may only receive multicast data from a single multicast group at one time.

The term "querier" or "querier device" refers to a network device which can perform some of the functions of an IGMP centralized querying host. The functionality of the querier can be implemented on a device separate from or the same as any of the intermediate switches or other network devices in the network. The querier can send a query which requests a response from all client devices in a network or from a subset of client devices in the network, e.g., hosts associated with a particular multicast group.

The term "network device" refers to devices, components, units, or entities which can include multiple ports or interfaces for uplinks and can communicate with other network devices in the manner described herein. Examples of network devices can include routers and switches.

Predicting IPTV Outages and Taking Preventive Actions

FIG. 1 illustrates a network environment 100 for a multicast data stream with improved user experience, in accordance with an aspect of the present application. Environment 100 can include: a source device/server 110 which sends data to subscribed hosts or client devices; a querier 112 which can be a designated router, switch, or other network device responsible for, e.g., periodically sending queries in an IGMP environment; a plurality of network devices (e.g., intermediate switches including but not limited to a switch 120, a switch 122, and a switch 124); and a plurality of client devices or hosts connected to a network device which serves as the next-hop switch for the connected client devices or hosts (e.g., a client 131, a client 132, a client 133, a client 134, and a client 135, where hosts 131-133 are connected to switch 120 as their next-hop switch and hosts 134-135 are connected to switch 122 as their next-hop switch). While FIG. 1 only depicts hosts 131-135 connected to switch 120 and switch 122, zero or more hosts may be connected to any of intermediate switches 122-124, where a respective intermediate switch serves as the next-hop switch for a respective host. Furthermore, while operations 170, 172, 174, and 176 are depicted as performed by switch 124 and operations 180, 182, 184, 186, and 188 are depicted as performed by switch 120, these operations are depicted as illustrative only and may be performed by any or all of switches 120-124.

A client device may send to querier 112 a request for multicast data based on IGMP as the first-hop router protocol. This IGMP request may be referred to as a "join request" and may indicate that the client device wishes to receive data from source device 110, where the data is to be distributed or transmitted to the particular multicast group. For example, client 131 may send a join 150 request, client 132 may send a join 152 request, and client 133 may send a join 154 request. Join requests 150-154 may be sent to querier 112 and indicate that the respective client wishes to subscribe to a particular multicast group (i.e., receive from source device 110 multicast data 130 associated with the particular multicast group). Upon receiving multicast data 130, querier 112 may send multicast data 130 through the network of interconnected switches (depicted as multicast data 132 to switch 124, multicast data 134 to switch 122, and multicast data 136 to switch 120). Switch 120 can determine that client devices 131-133 have previously subscribed to multicast data 136 (based on tracking the ports from which join requests 150-152 were originally received). Switch 120 can forward the multicast data to the respective client devices 131-133 as, e.g.: multicast data 140 to client 131; multicast data 142 to client 132; and multicast data 144 to client 133.

Querier 112 may also periodically send out query messages to all hosts in the network (e.g., an "all-host query") or to all hosts in a specific multicast group (e.g., a "group-specific query"). A client device can respond to a respective query message by sending a join message back to querier 112 indicating that the particular client device wishes to remain in the multicast group. The transmission of the IGMP query messages from querier 122 and the responsive IGMP join messages from the client devices can used to prevent the loss of data in the network. In addition, the Layer-2 IGMP snooping protocol may prevent flooding of multicast data in a Layer-2 segment by sending data on only two multicast joined ports, which can result in effective utilization of the available bandwidth of the network.

In the topology of environment 100, the cascading of control plane information may result in an increased join latency as well as an increased leave latency, such as when leaving one multicast group and joining another multicast group or when switching from one channel to another channel in an IPTV environment. When querier 112 sends a query message to all hosts in the network (or all hosts in a multicast group), a respective host can transmit a join message back to querier 112. The join message can indicate that the host is still subscribed to the multicast group which receives data from source device 110 (e.g., the host is still watching a given IPTV channel). However, in a scaled network topology where multiple multicast clients or hosts are subscribed to multiple multicast groups (e.g., a multi-client port scenario), the query sent by querier 110 can trigger multiple join messages for the same multicast group, which can result in a significant amount of packets exchanged on the path between the clients and querier 112. The potentially voluminous amount of join messages may increase the latency at all cascaded levels, which may contribute to the delayed handling of multicast packets by the intermediate network devices (e.g., switches 120-124), which in turn can result in decreased performance and efficiency in the network due to the significant amount of control plane traffic.

The described aspects address this issue by using a variety of methods to compute analytics in the control plane, which enhances the performance of the data plane, e.g., enhances the rate at which the data plane is programmed in order to improve the overall user experience during typical multicast events such as logging in to watch a new channel and switching channels while watching IPTV.

In a first method, the system can analyze and categorize a pattern of multicast traffic, and prioritize the multicast traffic accordingly based on the category or pattern. Multicast traffic or packets can be categorized into a number of categories, e.g.: IPTV; closed-circuit television (CCTV); Simple Service Discovery Protocol (SSDP)/Precision Time Protocol (PDP); and reserved multicast data or multicast Domain Name System (mDNS). Different multicast groups may be present in a network at any given time, and protocols such as IGMP and Protocol Independent Multicast (PIM) may program in hardware the data associated with the multicast packets without differentiating between the packets.

The described embodiments can leverage certain known and observable characteristics of the multicast traffic to differentiate between multicast packets and determine a category for the multicast traffic. These characteristics may include, e.g.: a direction of a flow of the multicast data; a volume or rate of the flow of the multicast data; and an amount of resources or bandwidth consumed by the flow of the multicast data. The direction of flow can be determined by monitoring the traffic for a period of time, and the speed (based on volume or rate) of the traffic can be learned or determined from the flow rate once the data has been programmed in the hardware. In addition, certain IP address types may be well known and can indicate the traffic type (e.g., mDNS, SSDP, etc.).

The described categories of multicast traffic may be associated with different values or ranges of values for a respective characteristic. For example, IPTV generally includes North-South traffic at a high volume, with multiple join and leave requests for various streams because users may typically be switching channels. CCTV can be characterized by South-North traffic or East-West traffic, because CCTV feeds (South or East) may be sent to and stored in servers in data centers (North) or local servers (West). CCTV feeds may typically consume low bandwidth compared to IPTV, but may consume more bandwidth than control plane multicast data. SSDP packets may generally be characterized by East-West traffic, while PTP may be generally characterized by North-South or South-North traffic. SSDP/PTP multicast data can generally be much lower in volume than both IPTV and CCTV. Reserved multicast and mDNS may not be routable and thus may not be programmed locally. This type of traffic may consume a much lower bandwidth than the other categories.

The various protocol modules of a network device may program entries in hardware based on both control plane and date plane packets. The control plane packets can include the request packet (IGMP and PIM) for a multicast group, while the user data may include the actual multicast packet. Once the multicast traffic has been categorized and given a priority, the network device can program certain multicast categories (e.g., high bandwidth IPTV) more quickly in the hardware in the event of multiple requests (i.e., bulk join requests) or in the event of high availability or link failures. For example, in FIG. 1, switch 124 can categorize received multicast data (e.g., multicast data 132) (operation 170) and subsequently prioritize traffic based on the categorization (operation 172). Switch 124 may continuously learn and categorize the multicast groups while receiving packets. This categorization and prioritization may affect how and when multicast data (e.g., multicast data 134 and 136) can be subsequently transmitted to downstream switches and subscribed client devices. Switch 124 can keep certain low bandwidth-consuming traffic (e.g., control plane, SSDP/ PTP, mDNS) in software only and can save the hardware resources for the high bandwidth-consuming multicast groups (e.g., IPTV channels)s.

The IP multicast command "sh multicast users" can display information related to the categorization and prioritization by including additional fields or by using the command "sh multicast categories." The information can include, e.g., the various categories of multicast traffic, the prioritization or priority of certain categories as an ordered list, the category for a respective multicast group, the direction of data flow for traffic associated with the respective multicast group, and details of multicast groups and subscribed users based on the categories. In an IPTV environment, the user-related details can include, e.g., the channels and the users which have subscribed to the various channels, including the frequency and duration of the subscriptions to a respective channel.

Data in the control plane can be processed by, e.g., a central processing unit (CPU) with one or more processors or cores, while multicast data can be processed in the data plane, e.g., by a multicast module of the network device. In a second method, the system can determine a first load of a processor associated with the network device and a second load of a multicast traffic-processing module of the network device.

In a typical steady state, the system may begin in a single-threaded state. In some instances, the system may determine to move to a multi-threaded state. The system can monitor the first load and the second load in real time. While the source device is transmitting multicast data to the subscribed client devices through the cascading network devices, the system can compare the first load and the second load (e.g., as a ratio) to a predetermined threshold and take an action based on the comparison. For example, if the ratio of the first load to the second load exceeds the predetermined threshold, the system can spawn one or more additional threads which can assist with the second load of the multicast traffic-processing module of the network device (also referred to as "multicast worker threads"). This can allow the system to handle a higher load of multicast traffic while the overall CPU load remains manageable. For example, in FIG. 1, switch 124 can identify the network load versus the multicast module load (operation 174) and subsequently spawn additional multicast worker threads if needed, e.g., based on a comparison of the ratio of the loads to a predetermined threshold (operation 176).

As another example, the system can determine in real-time that a first traffic type incurs a greater network or CPU load than a second traffic type and can spawn additional threads to handle the first traffic type. In yet another example, the system can track the number of join requests received by the network device over a certain period of time, and if that number exceeds a predetermined number, the system can spawn additional threads. Thus, in this second method, the dynamic feature of identifying the network load and acting accordingly can allow the system to react to the traffic as it occurs, which can improve the performance of the network as well as the overall user experience.

In a third method, the system can pre-program multicast groups on a port of a client device by predicting the multicast groups in which the client device may be interested. The system can learn these multicast groups by using the information from the group identification of the first method, e.g., the system can learn that a particular multicast group corresponds to an IPTV client. For each such IPTV client, the system can store the corresponding MAC address of the client device in a cache in the network device, i.e., the "IGMP module cache" or the "IGMP cache." The system can also store a list of the multicast groups that a particular client device has previously joined (e.g., a list of the channels that the client device has previously watched). This list of multicast groups can be ordered based on various factors, including, but not limited to: a frequency or duration of joining a respective multicast group; a frequency of leaving the respective multicast group; a category determined by previously classified multicast data; a hierarchy or combination of one or more multicast groups; and a weight, priority, or other score calculated for or assigned to the respective multicast group. For example, if a user watches ESPN at a greater frequency than any other channel, the stored user history can reflect this user activity by ordering the ESPN channel as the highest-ranking multicast group in the ordered list.

This third method can be applied in two scenarios: initial login; and switching channels. In the first scenario, the user may log in for the first time to watch IPTV, in which case the MAC address of the client can be learned based on a gratuitous Address Resolution Protocol (ARP) packet sent by the client. The system can search for the client MAC address in the IGMP cache to obtain the corresponding ordered list. If a match exists, the system can send a pre-programmed join for the highest-ranking multicast group in the ordered list prior to the user selecting any channel to watch. In IPTV, the system can predict that the user will wish to watch the highest-ranking IPTV channel in the ordered list of channels, and pre-emptively send a join request to receive data for that channel. This predicted and pre-programmed join may thus provide the user with an immediate viewing experience, which may eliminate any wait time associated with the join latency for selecting that same highest-ranking channel.

In the second scenario, the user may wish to switch channels while watching an IPTV channel, which can involve sending a leave request for the current channel and sending a new join request for a new channel, as well as a standard ARP packet. Based on the client MAC address in the standard ARP packet, the system can similarly search for the client MAC address in the IGMP cache to obtain the corresponding ordered list. If the user is not already watching the highest-ranking channel, the system can predict and pre-program a join request for the highest-ranking multicast group. If the user is already watching the highest-ranking channel, the system can predict and pre-program a join request for the next highest-ranking multicast group in the ordered list.

In both the first and second scenarios, if the predicted and pre-programmed join request does not match the actual or new join request from the user, the system can replace the pre-programmed join request with the actual or new join request, or the pre-programmed join request may time out.

For example, in FIG. 1, switch 120 can monitor telemetry of client 133 (including history and activity relating to joining and leaving multicast groups), store the client telemetry, and order or rank the list of multicast groups or channels (operation 180). In the first scenario (client login), switch 120 may receive a gratuitous ARP (not shown) from client 133 prior to receiving an initial join request 154 from client 133. Based on the client MAC from the gratuitous ARP, switch 120 can search its IGMP cache (not shown) for a corresponding entry to obtain an ordered list for client 133. Switch 120 can pre-program a join request for the highest-ranked multicast group in the ordered list (operation 182) and transmit the pre-programmed join request to querier 112 (depicted as 162, 165, and 168).

In the second scenario (switching channels), switch 120 may receive a standard ARP (not shown) from client 133 prior to receiving a leave request 156 and a subsequent new join request 158 from client 133. Based on the client MAC from the standard ARP, switch 120 can search its IGMP cache (not shown) for the corresponding entry to obtain the ordered list for client 133. If client 133 is currently subscribed to or watching a channel which is not the highest-ranking channel in the ordered list, switch 120 can pre-program a join request for the highest-ranking multicast group in the ordered list (operation 184) and transmit the pre-programmed join request to querier 112 (depicted as 162, 165, and 168). If client 133 is currently subscribed to or watching a channel which is the highest-ranking channel in the ordered list, switch 120 can pre-program a join request for the next highest-ranking multicast group in the ordered list (operation 184) and similarly transmit the pre-programmed join request to querier 112 (depicted as 162, 165, and 168). Thus, subsequent to receiving leave 156 (which is transmitted to querier 112 as 161, 164, and 167), switch 120 can preemptively generate and send pre-programmed join 184 (which is transmitted to querier 112 as 162, 165, and 168).

In both the first and second scenarios, if the predicted and pre-programed join (from operations 182 and 184) does not match the actual user join (154 or 158), the pre-programmed join will be replaced with the actual join (depicted as join 158, 160, 163, and 166), or the pre-programmed join will time out. For example, if client 133 is the last or only remaining client device programmed on a respective port, switch 120 can replace the pre-programmed join with the actual join. However, if client 133 is not the only remaining device programmed on the port, the switch may not have knowledge of whether to replace the pre-programmed join, since there may be other client devices connected to or downstream from the switch which are interested in the pre-programmed join. The pre-programmed join will time out only if no other client devices on the port are currently subscribed to receive data from the multicast group associated with the pre-programmed join.

As with the first method, the commands and additional fields related to "sh multicast categories" and "sh multicast users" may be used to display the groups that a given user has previously joined as well as the different categories of multicast groups. This information can be displayed to indicate to a user which multicast groups may be proactively programmed (i.e., as the predicted and pre-programmed join requests to those multicast groups), both when a user or client device initially logs in and when the user or client device switches multicast groups during operation. In addition, the command "sh ip igmp groups" can be enhanced to display the groups which are proactively programmed even before an actual join request is sent as well as the multicast groups which are programmed regularly. For example, in IPTV, the displayed information can indicate to the user which IPTV channels may be proactively programmed when the user initially logs in and when the user switches IPTV channels.

In a fourth method, the system can identify a type and a capacity associated with its peer devices, by communicating with the peer devices via Link Layer Discovery Protocol (LLDP) packets. Certain Tag Length Value (TLV) fields in the LLDP packets may be used to identify a network device, its type, and its CPU or processing capacity. If a peer device is determined to be of a certain type and capacity, the network device can adjust the control packets (i.e., the join requests and the leave requests) accordingly. For example, if the network device determines that a peer device is a switch which has low horsepower (i.e., low capacity) and thus may provide a decreased bandwidth or a lower speed for handling traffic, the network device may summarize or aggregate multiple IGMP join requests into a single join request. The network device may take a similar aggregation action for multiple IGMP leave requests into a single leave request.

Furthermore, if the network device determines that a link connected to the peer device "flaps" (i.e., the communication link alternates between up and down states), the network device may not send all join requests at the same time, but may send the join requests in a staggered form to allow the peer device of the lower capacity (with the flapping link) to better handle the transmitted join requests. The network device can also group join requests and leave requests based on the capacity of the link connected to the peer device. If the link is a Link Aggregation Group (LAG) and not a single link, the network device can group multiple join requests together and send them in bulk as a single join. If the link is a single link, the network device may choose to group the multiple join requests in smaller sub-groups, send the grouped join requests in a staggered form, or send the join requests as single join requests. The network device may take a similar action for multiple IGMP leave requests based on the capacity of the link connected to the peer device.

For example, switch 120 may receive LLDP packets which indicate that its peer device switch 122 has a low capacity (operation 186). When switch 120 receives multiple join requests from multiple client devices (e.g., joins 150-154 from, respectively, client devices 131-133), switch 120 may adjust the traffic (operation 188) by aggregating those multiple join requests and send a single join request, such as a join 160, to switch 122. In another example, if switch 120 determines that that link to its peer device switch 122 flaps (operation 186), switch 120 may determine to adjust the traffic to switch 122 by sending join 150, 152, and 154 as sub-groups in a staggered form (operation 188). Switch 120 send join 150 as a single join request, group join 152 and 154 to obtain a grouped or partially aggregated request, and subsequently send the grouped or partially aggregated join request for join 152 and 154.

Figures 2, 3:
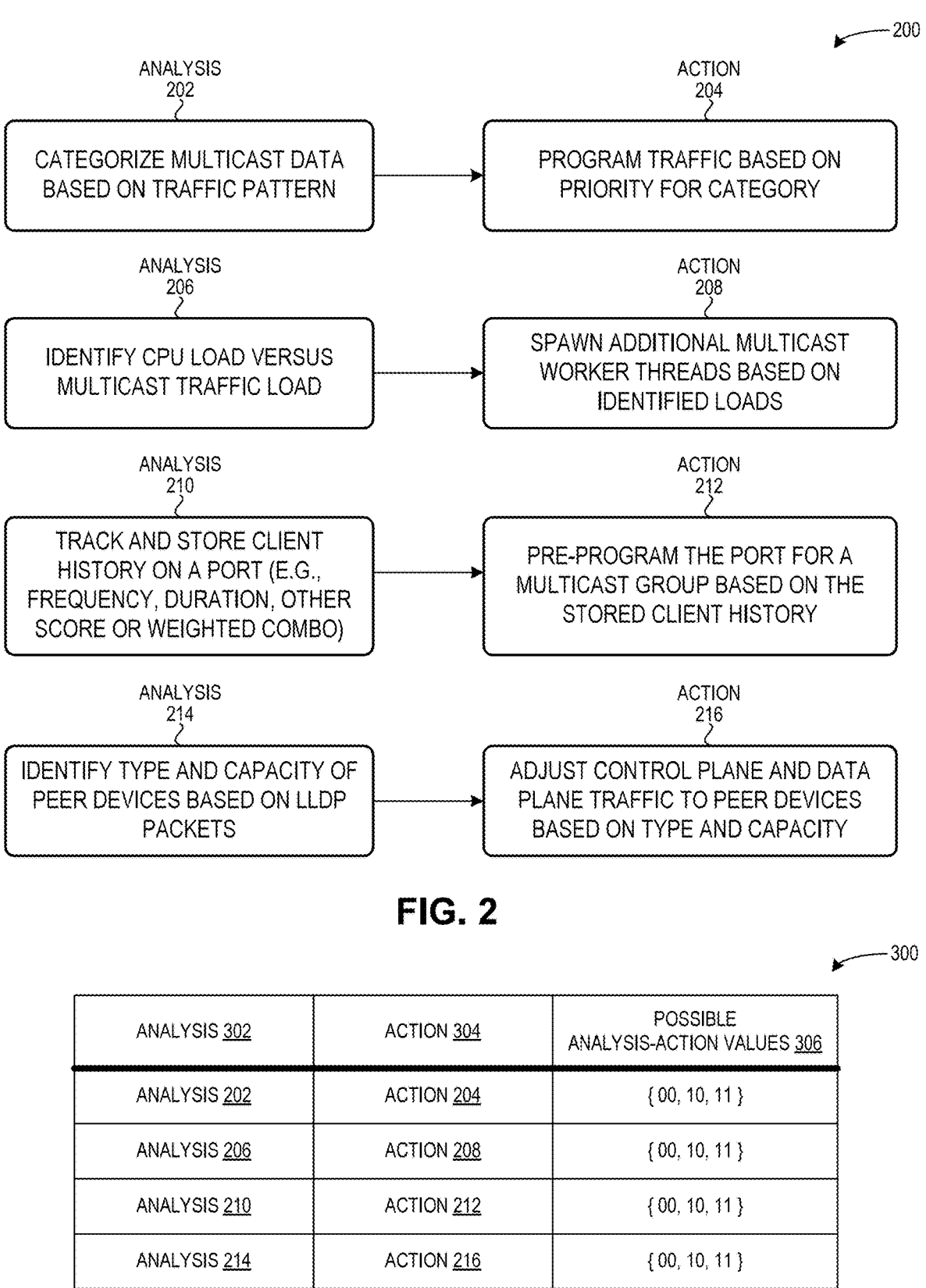
FIG. 2 illustrates a diagram of analysis-action pairs which facilitate a multicast data stream with improved user experience, in accordance with an aspect of the present application.
FIG. 3 presents a table depicting possible values for the analysis-action pairs of FIG. 2, in accordance with an aspect of the present application.

FIG. 2 illustrates a diagram 200 of analysis-action pairs which facilitate a multicast data stream with improved user experience, in accordance with an aspect of the present application. Diagram 200 depicts four pairs of analysis-action pairs corresponding to the four methods described herein.

Analysis 1 202 can include categorizing multicast data based on a traffic pattern (e.g., operation 170 of FIG. 1), and the corresponding action 204 can include programming the traffic based on a priority for the category (as in operation 172 of FIG. 1). Analysis 202 and corresponding action 204 can correspond to the first method described above.

Analysis 206 can include identifying the CPU load versus the multicast traffic load (as in operation 174 of FIG. 1), and the corresponding action 208 can include spawning additional multicast worker threads based on identified loads (as in operation 176 of FIG. 1). Analysis 206 and corresponding action 208 can correspond to the second method described above.

Analysis 210 can include tracking and storing client history on a port, e.g., based on frequency or duration of joining or leaving a multicast group (i.e., starting or stopping to watch an IPTV channel) or other score or weighted combination of factors (as in operation 180 of FIG. 1). The corresponding action 212 can include pre-programming the port for a particular multicast group based on the stored client history (as in operations 182 and 184 of FIG. 1). Analysis 210 and corresponding action 212 can correspond to the third method described above.

Analysis 214 can include identifying the type and capacity of peer devices based on LLDP packets (as in operation 186 of FIG. 1), and the corresponding action 216 can include adjusting the control plane and data plane traffic to the peer devices based on the type and capacity (as in operation 188 of FIG. 1). Analysis 214 and corresponding action 216 can correspond to the first method described above.

FIG. 3 presents a table 300 depicting possible values for the analysis-action pairs of FIG. 2, in accordance with an aspect of the present application. The described embodiments can include a system in which any one or more of the analysis features or methods can be turned "on," with the corresponding action turned "on" or "off." The system can include a controller which configures the "on/off" state for the action-analysis pairs. The controller can be based on software, hardware, or a combination of hardware and software, as depicted below in relation to computer-readable medium 500 and corresponding instructions 510-520 of FIG. 5 as well as network device 600 and subsystems 632-642 of FIG. 6. Table 300 can include entries with columns for: an analysis 302; a corresponding action 304; and possible analysis-action values 306. A value of "0" can represent "off," while a value of "1" can represent "on." Each entry in table 300 can have three possible values: "00," indicating that the analysis and the action are both turned off; "10," indicating that the analysis is turned on but the corresponding action is turned off; and "11," indicating that both the analysis and corresponding action are turned on.

Furthermore, each of the four analysis-action pairs may operate alone or in combination with the other analysis-action pairs. That is, each pair does not depend on any other pair and may operate independently or in parallel with the other pairs. The predicted and proactive pre-programming of the third method may be enhanced by the categorization of multicast traffic of the first method. The categorization performed by analysis 202 of the first method can enhance the client telemetry which is tracked and stored by analysis 210 of the third method, which can result in an improved corresponding action 212 of the third method. Thus, the first and third methods may be used as an example of combining methods for effective and improved performance in network devices based on computed analytics.

Figure 4A:
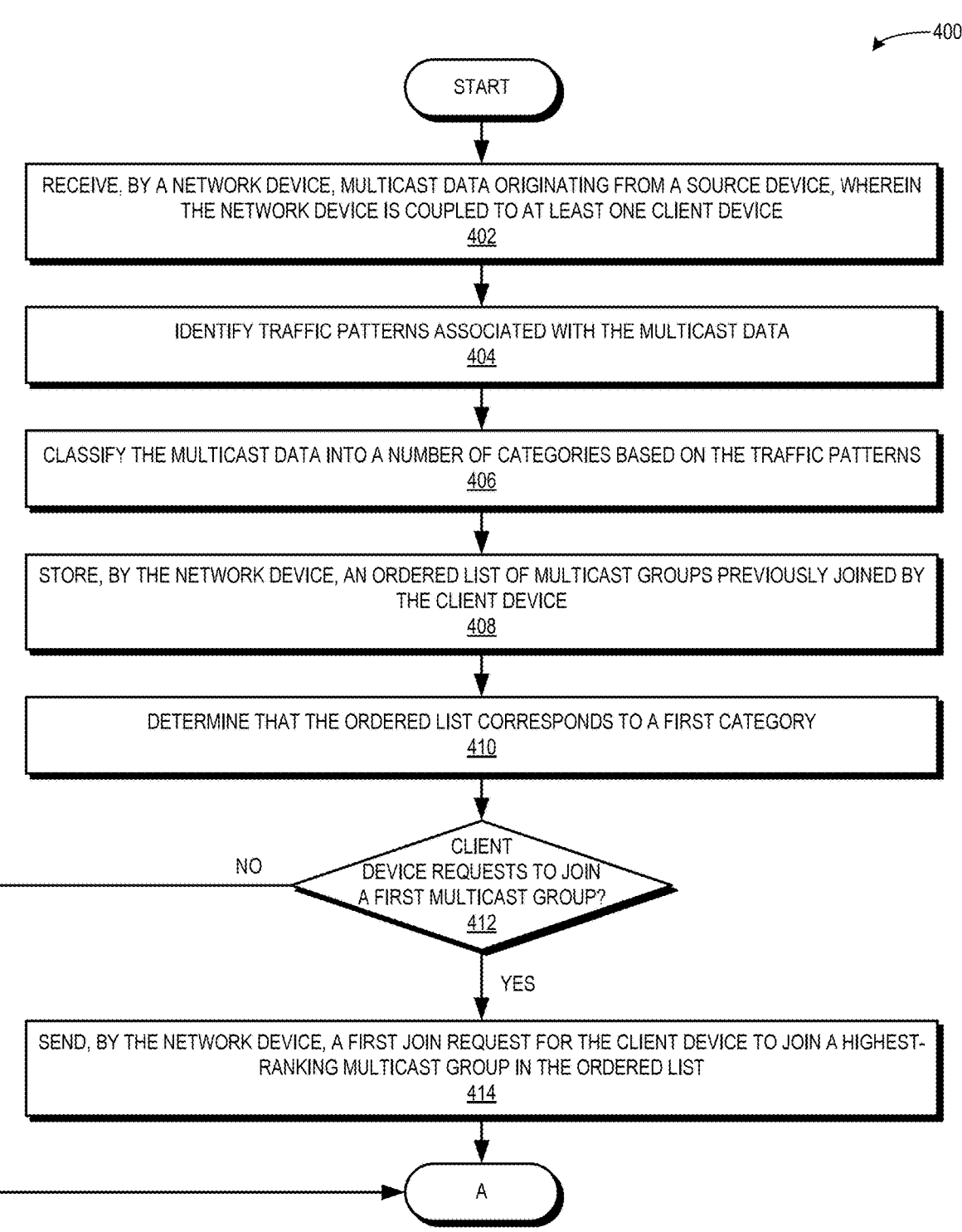
FIG. 4A presents a flowchart illustrating a method which facilitates a multicast data stream with improved user experience, in accordance with an aspect of the present application.

FIG. 4A presents a flowchart 400 illustrating a method which facilitates a multicast data stream with improved user experience, in accordance with an aspect of the present application. During operation, a network device receives multicast data originating from a source device, wherein the network device is in communication with at least one client device (operation 402). The network device can be one of a plurality of cascading network devices (e.g., intermediate switches) in a topology as depicted above in relation to FIG. 1. Each network device can be in communication with zero or more client devices. For example, in FIG. 1, switch 120 is in communication with three client devices (131, 132, and 133), switch 122 is in communication with two client devices (134 and 135), and switch 124 is in communication with zero client devices.

The system identifies traffic patterns associated with the multicast data (operation 404) and classifies the multicast data into a number of categories based on the traffic patterns (operation 406). The system can classify the multicast data based on, e.g., a direction of a flow of the multicast data, a volume of the flow of the multicast data, and an amount of resources or bandwidth consumed by the flow of the multicast data.

The system then determines and stores an ordered list of multicast groups previously joined by the client device (operation 408). The system can determine and dynamically reorder the ordered list based on one or more factors, including: a frequency or duration of joining or leaving a respective multicast group; a category determined by previously classified multicast data; a hierarchy or combination of one or more multicast groups; a weight, priority, or other score calculated for or assigned to the respective multicast group; a predetermined time interval; and an addition or deletion of a multicast group to or from the ordered list.

Subsequently, the system determines that the ordered list corresponds to a first category (operation 410). The ordered list may correspond to one of the categories of multicast data as classified by operation 406. Possible categories of multicast data may include, e.g., IPTV, CCTV, SSDP/PTP, and reserved multicast data or mDNS.

If the client device requests to join a first multicast group (decision 412), the system sends, by the network device, a first join request for the client device to join a highest-ranking multicast group in the ordered list (operation 414). The first join request may be associated with and occur upon an initial login process for the client device (e.g., an initial user login to IPTV, as in operation 182 of FIG. 1 depicting the generation of the pre-programmed login join). If the client device does not request to join a first multicast group (decision 412), the operation continues at Label A of FIG. 4B.

Figure 4B:
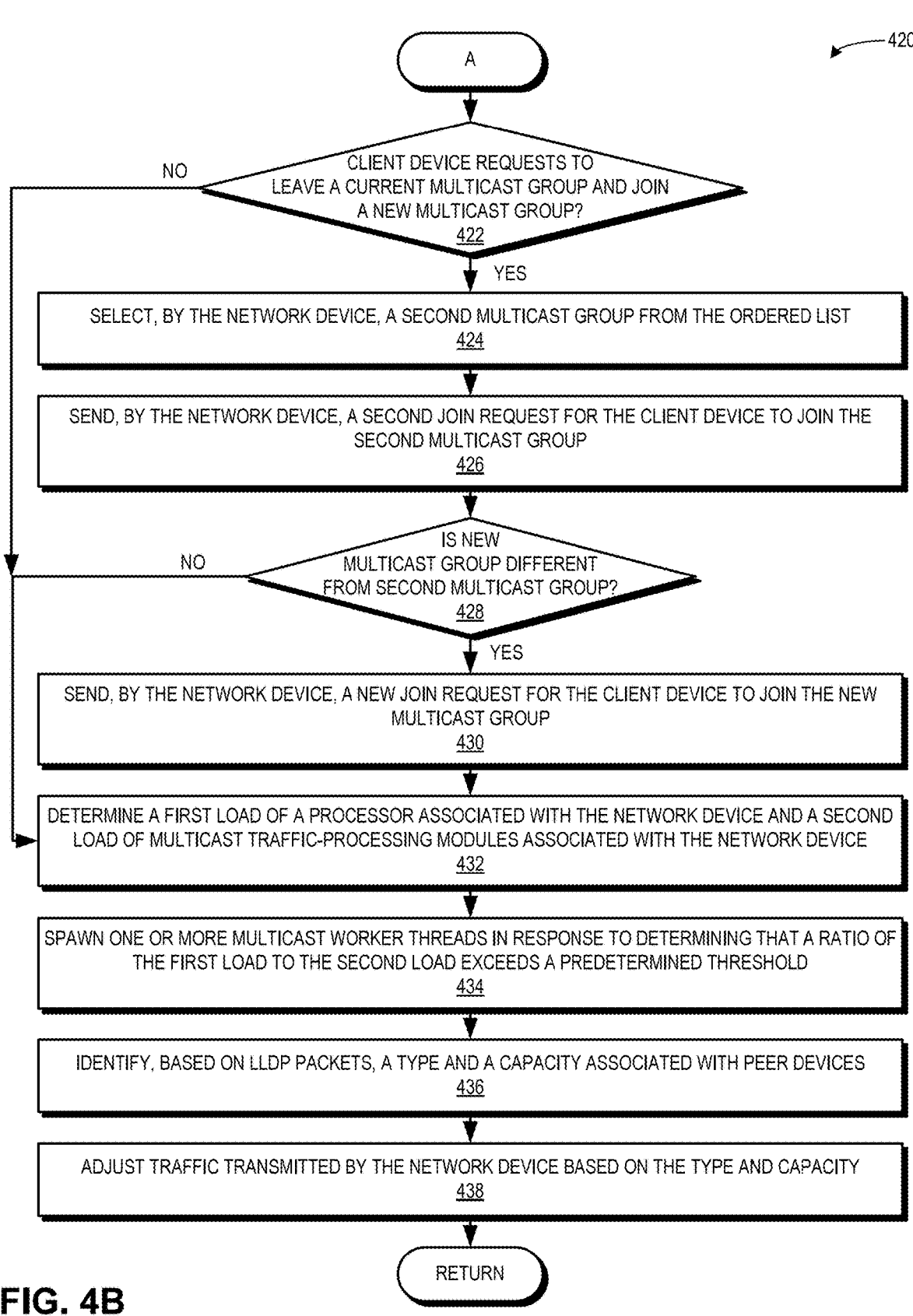
FIG. 4B presents a flowchart illustrating a method which facilitates a multicast data stream with improved user experience, in accordance with an aspect of the present application.

FIG. 4B presents a flowchart 420 illustrating a method which facilitates a multicast data stream with improved user experience, in accordance with an aspect of the present application. If the client device does not request to leave a current multicast group and join a new multicast group (decision 422), the operation continues at operation 432.

If the client device requests to leave a current multicast group and join a new multicast group (decision 422), the system selects, by the network device, a second multicast group from the ordered list (operation 424) and sends, by the network device, a second join request for the client device to join the second multicast group (operation 426). For example, client 133 may be watching a current channel and wish to switch to a new channel. Client 133 can send a leave 156 for the current channel (i.e., to leave the current multicast group) and a join 158 for the new channel (i.e., to join a new multicast group). Assuming that the third analysis-action pair (210/212) is turned on (as in FIGS. 2 and 3), the system can generate and send a pre-programmed join (as in operation 184 of FIG. 1) for the most frequently watched channel if the current channel is not the most frequently watched channel (i.e., the highest ranking multicast group in the ordered list) or send a pre-programmed join for the next most frequently watched channel if the current channel is the most frequently watched channel (i.e., the next highest-ranking multicast group in the ordered list).

If the new multicast group (associated with the join of decision 422) is not different from (i.e., is the same as) the second multicast group (associated with the pre-programmed join of operation 426) (decision 428), the operation continues at operation 432. If the new multicast group (associated with the join of decision 422) is different from the second multicast group (associated with the pre-programmed join of operation 426), the system determines that the predicted and pre-programmed join does not match the actual user-requested join (decision 428). As a result, the system sends, by the network device, a new join request for the client device to join the new multicast group (operation 430). The second join request can time out or be replaced by the new join request, as described above in relation to operations 182 and 184 of FIG. 1.

The system determines a first load of a processor associated with the network device and a second load of one or more multicast traffic-processing modules associated with the network device (operation 432). Subsequently, the system spawns one or more multicast worker threads in response to determining that a ratio of the first load to the second load exceeds a predetermined threshold (operation 434). The system can spawn the additional multicast worker threads further based on, e.g., a comparison of the first load to the second load, a comparison of the first load or the second load to a predetermined number, or any other comparison based on the first load or the second load. Spawning additional worker threads based on the determined first and second loads can correspond to the second analysis-action pair (206/208) of FIG. 2.

The system identifies, based on LLDP packets, a type and a capacity associated with one or more peer devices of the network device (operation 436). Next, the system adjusts traffic transmitted by the network device based on the type and capacity associated with the peer devices (operation 438). The system can adjust the traffic by, e.g., aggregating multiple join or leave requests into a single join or leave request, which can be determined based on processing power, link capacity, or link type such as a single physical link or a link aggregation group (LAG). Adjusting the traffic based on the identified type and capacity of peer devices can correspond to the fourth analysis-action pair (214/216) of FIG. 2. The operation returns.

Operations 432/434 and 436/438 are depicted in FIG. 4B as occurring after operation 430, but may occur independently of or in parallel with operations 402-414 of FIG. 4A and operations 422-430 of FIG. 4B.

The described aspects provide a specific implementation and technological solution (e.g., reducing control plane traffic in a network by predicting outages and taking preventive actions) to a technological problem in the computer arts (e.g., efficient flow of traffic, such as IPTV multicast data, in a network which includes multiple hosts subscribed to multicast groups via cascaded intermediate switches). The described aspects further integrate into a practical application because they are necessarily rooted in computer technology (e.g., increasing the efficiency of network switches and communication in a network) in order to overcome a problem specifically arising in the realm of computer networks (e.g., interrupted data flow in streaming multicast data due to increased control plane traffic).

FIG. 5 illustrates a computer-readable medium (CRM) 500 which facilitates a multicast data stream with improved user experience, in accordance with an aspect of the present application. CRM 500 can be a non-transitory computer-readable medium or device storing instructions that when executed by a computer or processor cause the computer or processor to perform a method. CRM 500 can store instructions 510 to receive multicast data, such as multicast data originating from a source device. CRM 500 can be in communication with at least one client device (e.g., switch 122 is in communication with client 135 in FIG. 1). CRM 500 can store instructions 512 to classify and prioritize the multicast data into a number of categories based on identified traffic patterns, and the identified traffic patterns are associated with the multicast data (as described above in relation to operations 170 and 172 in FIG. 1). Instructions 512 may correspond to the first method described above and in relation to FIGS. 1 and 2.

CRM 500 can also store instructions 516 to determine, store, and reorder an ordered list of multicast groups previously joined by the client device based on one or more factors. The factors can include, e.g.: a frequency or duration of joining a respective multicast group; a frequency of leaving the respective multicast group; a category determined by previously classified multicast data; a hierarchy or combination of one or more multicast groups; a weight, priority, or other score calculated for or assigned to the respective multicast group; a predetermined time interval; an addition of a new multicast group to the ordered list; and a deletion of an existing multicast group from the ordered list. Instructions 516 may correspond to the third method described above and in relation to FIGS. 1 and 2.

CRM 500 can further store instructions (not shown in FIG. 5) to determine that the ordered list corresponds to a first category, and the first category may be stored in a cache maintained by device 500. Entries in the cache may be indexed or associated with an identifier of a client device (e.g., a MAC address), and a respective entry may include one or more categories for multicast groups which the client device has previously joined.

CRM 500 can store instructions 518 to pre-program, based on the ordered list, a port for a selected multicast group. Pre-programming the port can include instructions to: responsive to determining that the client device requests to join a first multicast group, send a first join request for the client device to join a highest-ranking multicast group in the ordered list; and responsive to determining that the client device requests to leave a current multicast group and to join a new multicast group, select a second multicast group from the ordered list and send a second join request for the client device to join the second multicast group. Instructions 514 may correspond to the third method described above and in relation to FIGS. 1 and 2.

CRM 500 may additionally store instructions 514 to determine a system load, including a first CPU load and a second multicast module load and to spawn additional multicast worker threads based on the system load. CRM 500 may compare the first load with the second load to obtain a ratio and determine whether to spawn the additional threads based on a comparison of the ratio with a predetermined threshold. Instructions 514 may correspond to the second method described above and in relation to FIGS. 1 and 2.

CRM 500 may further store instructions 520 to determine, based on LLDP packets, a peer device capacity and type and to adjust traffic based on the capacity and type. CRM 500 can adjust the traffic by, e.g., aggregating multiple join or leave requests into a single join or leave request. The aggregation may be based on: a processing power associated with a respective peer devices; a capacity of a link connected to the respective peer device; or whether the link connected to the respective peer device is based on a physical link or a link aggregation group.

CRM 500 may include more instructions than those shown in FIG. 5. For example, CRM 500 can also store instructions for executing the operations described above in relation to: the operations depicted in environment 100 of FIG. 1; the operations depicted in flowcharts 400 and 420 of, respectively, FIGS. 4A and 4B; and the operations and instructions of the components and subsystems of network device 600 in FIG. 6. CRM 500 can also store instructions to perform the operations associated with using any combination of the four above-described methods.

Figure 6:
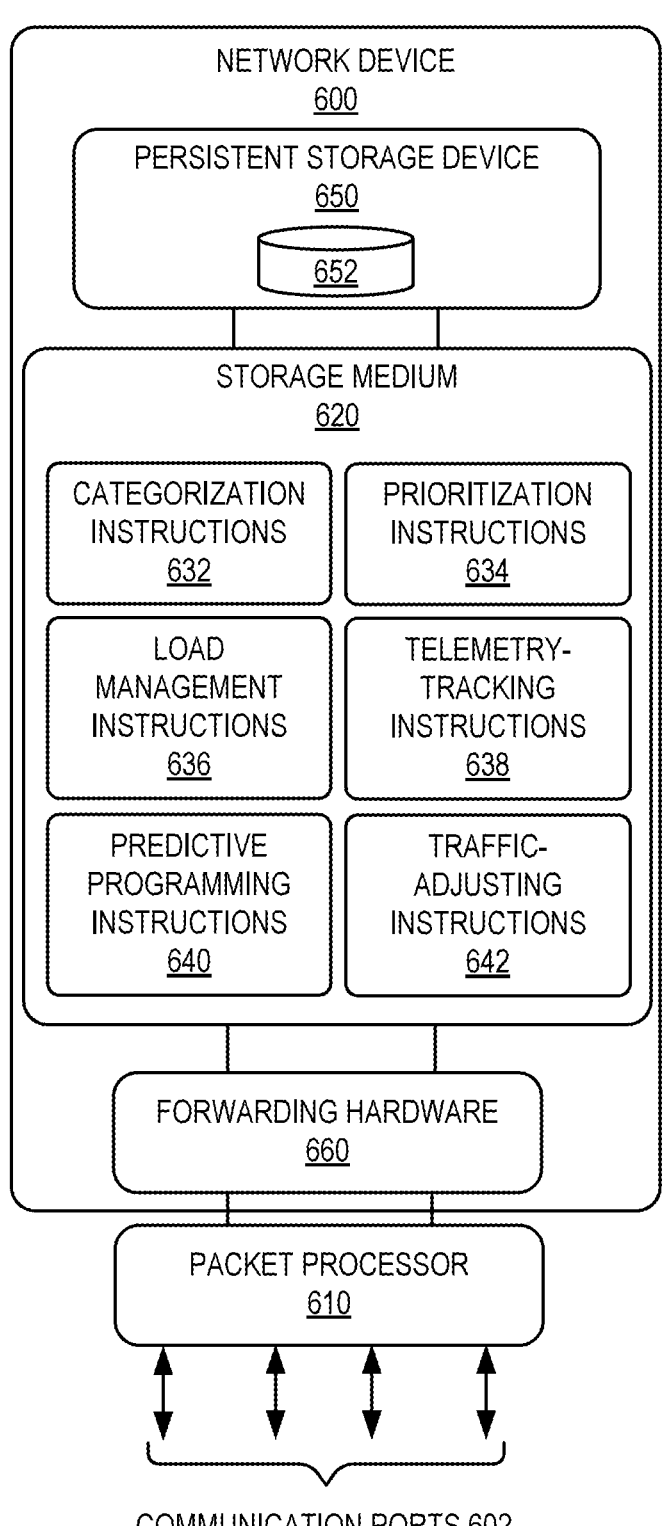
FIG. 6 illustrates a network device which facilitates a multicast data stream with improved user experience, in accordance with an aspect of the present application.

FIG. 6 illustrates a network device 600 which facilitates a multicast data stream with improved user experience, in accordance with an aspect of the present application. Network device 600, which can also be referred to as a switch 600, can include a number of communication ports 602, a packet processor 610, and a persistent storage device 650. Network device 600 can also include forwarding hardware 660 (e.g., processing hardware of network device 600, such as its application-specific integrated circuit (ASIC) chips), which includes information based on which network device 600 processes packets (e.g., determines output ports for packets).

Packet processor 610 can extract and process header information from the received packets. Packet processor 610 can identify a network device identifier (e.g., a MAC address and/or an IP address) associated with network device 600 in the header of a packet. Network device 600 can include a storage medium 620. In some examples, storage medium 620 can include a set of volatile memory devices (e.g., dual in-line memory module (DIMM)) (not shown). Network device 600 can operate as a switch (120, 122, and 124 of FIG. 1) in a cascading hierarchical topology which includes a source device (110), a querier (112), a plurality of intermediate switches (122 and 124), and an endpoint switch (120), where one or more client devices (131-135) may be in communication with each switch, as described above in relation to FIG. 1.

Communication ports 602 can include inter-device communication channels for communication with other network devices and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Network device 600 can maintain a database 652 (e.g., in storage device 650). Database 652 can be a relational database and may run on one or more Database Management System (DBMS) instances. Database 652 can store information associated with the routing, configuration, and interfaces of network device 600. Database 652 may store the routing data structures populated based on various routing protocols. Storage medium 620 can include instructions that allow network device 600 to efficiently predict IPTV outages and take preventive actions within network device 600.

Storage medium 620 can include categorization instructions 632, prioritization instructions 634, load management instructions 636, telemetry-tracking instructions 638, predictive programming instructions 640, and traffic-adjusting instructions 642. Each respective set of instructions can be executable by network device 600 to perform one or more operations. Categorization instructions 632 can be executable to identify traffic patterns associated with the multicast data, similar to operation 170 of FIG. 1. Prioritization instructions 634 can be executable to classify the multicast data into a number of categories based on the traffic patterns, similar to operation 172 of FIG. 1. Instructions 632 and 634 can correspond to the first method and the first analysis-action pair (202/204) described herein.

Load management instructions 636 can be executable to: determine a first load of a processor associated with the network device; determine a second load of one or more multicast traffic-processing modules associated with the network device; and spawn one or more multicast worker threads in response to a comparison of the first load and the second load to a predetermined threshold. Instructions 636 can correspond to the second method and the second analysis-action pair (206/208) described herein.

Telemetry-tracking instructions 638 can be executable to store an ordered list of multicast groups previously joined by the client device. The ordered list can be created by monitoring activity of a client device related to joining or leaving multicast groups, including but not limited to the factors described above in relation to instructions 516 of FIG. 5. Predictive programming instructions 640 can be executable to: responsive to determining that the client device requests to join a first multicast group, send a first join request for the client device to join a highest-ranking multicast group in the ordered list; and responsive to determining that the client device requests to leave a current multicast group and to join a new multicast group, select a second multicast group from the ordered list and send a second join request for the client device to join the second multicast group. Instructions 638 and 640 can correspond to the third method and the third analysis-action pair (210/212) described herein.

Traffic-adjusting instructions 642 can be executable to identify, based on LLDP packets, a type and a capacity associated with one or more peer devices of the network device. Traffic-adjusting instructions 642 can also be executable to adjust traffic transmitted by the network device based on the type and capacity associated with the peer devices. Network device 600 can adjust the traffic by aggregating multiple join or leave requests into a single join or leave request based on, e.g., one or more of: a processing power associated with a respective peer device; a capacity of a link connected to the respective peer device; and whether the link connected to the respective peer device is based on a physical link or a link aggregation group.

Network device 600 may include more instructions than those shown in FIG. 6. For example, network device can also store instructions for executing the operations described above in relation to: the operations depicted in environment 100 of FIG. 1; the operations depicted in flowcharts 400 and 420 of, respectively, FIGS. 4A and 4B; and the instructions of CRM 500 in FIG. 5. Network device 600 can also store instructions to perform the operations associated with using any combination of the four above-described methods.

In general, the disclosed aspects provide a method, a non-transitory computer-readable storage medium, and a network device in a system for facilitating reducing control plane traffic in a network. During operation, the system receives, by a network device, multicast data originating from a source device, wherein the network device is in communication with at least one client device. The system identifies traffic patterns associated with the multicast data and classifies the multicast data into a number of categories based on the traffic patterns. The system stores, by the network device, an ordered list of multicast groups previously joined by the client device. Responsive to determining that the client device requests to join a first multicast group, the system sends, by the network device, a first join request for the client device to join a highest-ranking multicast group in the ordered list. Responsive to determining that the client device requests to leave a current multicast group and to join a new multicast group: the system selects, by the network device, a second multicast group from the ordered list; and the system sends, by the network device, a second join request for the client device to join the second multicast group.

In a variation on this aspect, the multicast data is transmitted to the network device from the source device via a querier device operating based on Internet Group Management Protocol (IGMP), and the querier device receives and processes requests to join or leave a multicast group.

In a further variation, the system stores the ordered list based on an identifier of the client device. Prior to sending the first join request for the client device to join the highest-ranking multicast group and prior to selecting the second multicast group from the ordered list, the system obtains the ordered list of multicast groups based on the identifier of the client device.

In a further variation, the system determines or reorders the ordered list of multicast groups based on at least one of: a frequency or duration of joining a respective multicast group; a frequency of leaving the respective multicast group; a category determined by previously classified multicast data; a hierarchy or combination of one or more multicast groups; a weight, priority, or other score calculated for or assigned to the respective multicast group; a predetermined time interval; an addition of a new multicast group to the ordered list; or a deletion of an existing multicast group from the ordered list.

In a further variation, a respective category is associated with one or more of: Internet Protocol television (IPTV); closed-circuit television (CCTV); Simple Service Discovery Protocol (SSDP)/Precision Time Protocol (PTP); and reserved multicast data or multicast Domain Name System (mDNS).

In a further variation, the ordered list corresponds to a first category associated with IPTV, the first multicast group corresponds to a first IPTV channel, and the second multicast group corresponds to a second IPTV channel.

In a further variation, classifying the multicast data is further based on at least one of: a direction of a flow of the multicast data; a volume of the flow of the multicast data; or an amount of resources or bandwidth consumed by the flow of the multicast data.

In a further variation, sending the first join request for the client device to join the highest-ranking multicast group and sending the second join request for the client device to join the second multicast group are in response to: receiving a gratuitous Address Resolution Protocol (ARP) packet or a standard ARP packet from the client device; searching a data structure based on a client media access control (MAC) address learned from the gratuitous or standard ARP packet; and returning the ordered list of multicast groups, wherein the ordered list is mapped to the learned client MAC address.

In a further variation, in response to the new multicast group being different from the second multicast group, the system sends a new join request for the client device to join the new multicast group, and the second join request times out or is replaced by the new join request.

In a further variation, the system determines a first load of a processor associated with the network device. The system determines a second load of one or more multicast traffic-processing modules associated with the network device. The system spawns one or more multicast worker threads in response to determining that a ratio of the first load to the second load exceeds a predetermined threshold.

In a further variation, the system identifies, based on Link Layer Discovery Protocol (LLDP) packets, a type and a capacity associated with one or more peer devices of the network device. The system adjusts traffic transmitted by the network device based on the type and capacity associated with the peer devices.

In a further variation, adjusting the traffic comprises aggregating multiple join or leave requests into a single join or leave request based on at least one of: a processing power associated with a respective peer device; a capacity of a link connected to the respective peer device; or whether the link connected to the respective peer device is based on a physical link or a link aggregation group.

In another aspect, a non-transitory computer-readable storage medium (or CRM) is associated with a network device and stores instructions to: receive multicast data originating from a source device, wherein the network device is in communication with at least one client device; classify and prioritize the multicast data into a number of categories based on identified traffic patterns; store an ordered list of multicast groups previously joined by the client device based on one or more factors, wherein the ordered list corresponds to a first category; and pre-program, based on the ordered list, a port for a selected multicast group. The instructions to pre-program the port are to: responsive to determining that the client device requests to join a first multicast group, send, by the network device, a first join request for the client device to join a highest-ranking multicast group in the ordered list; and responsive to determining that the client device requests to leave a current multicast group and to join a new multicast group, select, by the network device, a second multicast group from the ordered list, and send, by the network device, a second join request for the client device to join the second multicast group. The non-transitory computer-readable storage medium can also store instructions as described above in relation to: switches 120-124 of FIG. 1; the analysis-action pairs of FIG. 2; the operations of FIGS. 4A and 4B; the instructions of CRM 500 of FIG. 5; and subsystems 632-642 of network device 600 of FIG. 6.

In yet another aspect, a network device comprises: a plurality of ports; a packet processor to receive multicast data originating from a source device, wherein the network device is in communication with at least one client device; forwarding hardware; a categorization subsystem to identify traffic patterns associated with the multicast data; a prioritization subsystem to classify the multicast data into a number of categories based on the traffic patterns; a telemetry-tracking subsystem to store an ordered list of multicast groups previously joined by the client device; and a predictive programming subsystem to perform one or more operations. The one or more operations can include: responsive to determining that the client device requests to join a first multicast group, send a first join request for the client device to join a highest-ranking multicast group in the ordered list; and responsive to determining that the client device requests to leave a current multicast group and to join a new multicast group, select a second multicast group from the ordered list, and send a second join request for the client device to join the second multicast group. The network device can also include subsystems which store instructions as described above in relation to: switches 120-124 of FIG. 1; the analysis-action pairs of FIG. 2; the operations of FIGS. 4A and 4B; the instructions of CRM 500 of FIG. 5; and subsystems 632-642 of network device 600 of FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:
1. A method, comprising:
   receiving, by a network device, multicast data originating from a source device, wherein the network device is in communication with at least one client device;
   identifying traffic patterns associated with the multicast data;

classifying the multicast data into a number of traffic categories based on the traffic patterns by computing analytics associated with a control plane of the network device;
storing, by the network device, information associating the multicast data with a respective traffic category and a list of multicast groups previously joined by the client device, the list ordered based on the computed analytics;
prioritizing, by the network device, processing of the multicast data in a data plane based on the respective traffic category;
responsive to determining that the client device requests to join or leave a multicast group:
   predicting, based on the computed analytics and the classified and processed multicast data, a next multicast group likely to be joined, the next multicast group comprising a highest ranking multicast group from the ordered list; and
   preprogramming a join request for the predicted next multicast group;
storing the ordered list based on an identifier of the client device;
responsive to determining that the client device requests to join the highest-ranking multicast group, sending, based on the ordered list, the preprogrammed join request for the predicted next multicast group;
responsive to determining that the client device requests to leave the highest-ranking multicast group, sending, based on the ordered list, the preprogrammed join request for the predicted next multicast group, which comprises a second highest-ranking multicast group from the ordered list;
determining that the client device requests to join the multicast group by sending a first join request to join a new multicast group different from the highest ranking multicast group from the ordered list; and
sending a new join request for the client device to join the new multicast group, wherein the first join request times out or is replaced by the new join request.
2. The method of claim 1,
wherein the multicast data is transmitted to the network device from the source device via a querier device operating based on Internet Group Management Protocol (IGMP), and
wherein the querier device receives and processes requests to join or leave a multicast group.
3. The method of claim 1, further comprising:
determining or reordering the ordered list of multicast groups based on at least one of:
   a frequency or duration of joining a respective multicast group;
   a frequency of leaving the respective multicast group;
   a category determined by previously classified multicast data;
   a hierarchy or combination of one or more multicast groups;
   a weight, priority, or other score calculated for or assigned to the respective multicast group;
   a predetermined time interval;
   an addition of a new multicast group to the ordered list; or
   a deletion of an existing multicast group from the ordered list.
4. The method of claim 1, wherein a respective category is associated with one or more of:
   Internet Protocol television (IPTV);

closed-circuit television (CCTV);

Simple Service Discovery Protocol (SSDP)/Precision Time Protocol (PTP); and reserved multicast data or multicast Domain Name System (mDNS).

5. The method of claim 1, wherein the ordered list corresponds to a first category associated with IPTV, wherein a respective multicast group corresponds to an IPTV channel.

6. The method of claim 1, wherein classifying the multicast data is further based on at least one of:

a direction of a flow of the multicast data;

a volume of the flow of the multicast data; or an amount of resources or bandwidth consumed by the flow of the multicast data.

7. The method of claim 1, wherein determining that the client device requests to join or leave the multicast group comprises:

receiving a gratuitous Address Resolution Protocol (ARP) packet or a standard ARP packet from the client device;

searching a data structure based on a client media access control (MAC) address learned from the gratuitous or standard ARP packet; and returning the ordered list of multicast groups, wherein the ordered list is mapped to the learned client MAC address.

8. The method of claim 1, further comprising:

determining a first load of a processor associated with the network device;

determining a second load of one or more multicast traffic-processing modules associated with the network device; and spawning one or more multicast worker threads in response to determining that a ratio of the first load to the second load exceeds a predetermined threshold.

9. The method of claim 1, further comprising:

identifying, based on Link Layer Discovery Protocol (LLDP) packets, a type and a capacity associated with one or more peer devices of the network device; and adjusting traffic transmitted by the network device based on the type and capacity associated with the peer devices.

10. The method of claim 9, wherein adjusting the traffic comprises aggregating multiple join or leave requests into a single join or leave request based on at least one of:

a processing power associated with a respective peer device;

a capacity of a link connected to the respective peer device; or whether the link connected to the respective peer device is based on a physical link or a link aggregation group.

11. A non-transitory computer-readable storage medium associated with a network device and storing instructions to:

receive multicast data originating from a source device, wherein the network device is in communication with at least one client device;

classify and prioritize processing of the multicast data into a number of traffic categories based on identified traffic patterns by computing analytics associated with a control plane of the network device;

store information associating the multicast data with a respective traffic category and a list of multicast groups previously joined by the client device, the list ordered based on the computed analytics;

responsive to determining that the client device requests to join or leave a multicast group:

predict, based on the computed analytics and the classified and processed multicast data, a next multicast group likely to be joined, the next multicast group comprising a highest ranking multicast group from the ordered list; and preprogram a join request for the predicted next multicast group store the ordered list based on an identifier of the client device;

responsive to determining that the client device requests to join the highest-ranking multicast group, send, based on the ordered list, the preprogrammed join request for the predicted next multicast group;

responsive to determining that the client device requests to leave the highest-ranking multicast group, send, based on the ordered list, the preprogrammed join request for the predicted next multicast group, which comprises a second highest-ranking multicast group from the ordered list;

determine that the client device requests to join the multicast group by sending a first join request to join a new multicast group different from the highest ranking multicast group from the ordered list; and send a new join request for the client device to join the new multicast group, wherein the first join request times out or is replaced by the new join request.

12. The non-transitory computer-readable storage medium of claim 11, the instructions further to:

determine the ordered list of multicast groups based on one or more factors which include at least one of:

a frequency or duration of joining a respective multicast group;

a frequency of leaving the respective multicast group;

a category determined by previously classified multicast data;

a hierarchy or combination of one or more multicast groups; or a weight, priority, or other score calculated for or assigned to the respective multicast group; and reorder the ordered list of multicast groups based on at least one of:

the one or more factors;

a predetermined time interval;

an addition of a new multicast group to the ordered list; or a deletion of an existing multicast group from the ordered list.

13. The non-transitory computer-readable storage medium of claim 11, the instructions further to:

identify, based on Link Layer Discovery Protocol (LLDP) packets, a type and a capacity associated with one or more peer devices of the network device; and adjust traffic transmitted by the network device based on the type and capacity associated with the peer devices.

14. A network device, comprising:

a plurality of ports;

a packet processor to receive multicast data originating from a source device, wherein the network device is in communication with at least one client device;

forwarding hardware;

categorization instructions to:

identify traffic patterns associated with the multicast data; and classify the multicast data into a number of traffic categories based on the traffic patterns by computing analytics associated with a control plane of the network device; and prioritization instructions to prioritize processing of the multicast data in a data plane based on the respective traffic category;

telemetry-tracking instructions to store information associating the multicast data with a respective traffic category and a list of multicast groups previously joined by the client device, the list ordered based on the computed analytics; and predictive programming instructions to:

responsive to determining that the client device requests to join or leave a multicast group:

predict, based on the computed analytics and the classified and processed multicast data, a next multicast group likely to be joined, the next multicast group comprising a highest ranking multicast group from the ordered list; and preprogram a join request for the predicted next multicast group store the ordered list based on an identifier of the client device;

responsive to determining that the client device requests to join the highest-ranking multicast group, send, based on the ordered list, the preprogrammed join request for the predicted next multicast group;

responsive to determining that the client device requests to leave the highest-ranking multicast group, send, based on the ordered list, the preprogrammed join request for the predicted next multicast group, which comprises a second highest-ranking multicast group from the ordered list;

determine that the client device requests to join the multicast group by sending a first join request to join a new multicast group different from the highest ranking multicast group from the ordered list; and send a new join request for the client device to join the new multicast group, wherein the first join request times out or is replaced by the new join request.

15. The network device of claim 14, the categorization instructions further to classify the multicast data based on at least one of:

a direction of a flow of the multicast data;

a volume of the flow of the multicast data; or an amount of resources or bandwidth consumed by the flow of the multicast data; and the predictive programming instructions further to determine and reorder the ordered list of multicast groups based on at least one of:

a frequency or duration of joining a respective multicast group;

a frequency of leaving the respective multicast group;

a category determined by previously classified multicast data;

a hierarchy or combination of one or more multicast groups;

a weight, priority, or other score calculated for or assigned to the respective multicast group;

a predetermined time interval;

an addition of a new multicast group to the ordered list; or a deletion of an existing multicast group from the ordered list.

16. The network device of claim 14, further comprising load management instructions to:

determine a first load of a processor associated with the network device;

determine a second load of one or more multicast traffic-processing modules associated with the network device; and spawn one or more multicast worker threads in response to a comparison of the first load and the second load to a predetermined threshold.

17. The network device of claim 14, further comprising traffic-adjusting instructions to:

identify, based on Link Layer Discovery Protocol (LLDP) packets, a type and a capacity associated with one or more peer devices of the network device; and adjust traffic transmitted by the network device based on the type and capacity associated with the peer devices, wherein adjusting the traffic comprises aggregating multiple join or leave requests into a single join or leave request based on at least one of:

a processing power associated with a respective peer device;

a capacity of a link connected to the respective peer device; or whether the link connected to the respective peer device is based on a physical link or a link aggregation group.

* * * * *